(12) United States Patent
Guo et al.

(10) Patent No.: US 10,212,770 B2
(45) Date of Patent: Feb. 19, 2019

(54) AC-DC SINGLE-INDUCTOR MULTIPLE-OUTPUT LED DRIVERS

(71) Applicant: THE UNIVERSITY OF HONG KONG, Hong Kong (CN)

(72) Inventors: Yue Guo, Shenzhen (CN); Ting Leung Albert Lee, Hong Kong (CN); Sinan Li, Hong Kong (CN); Siew Chong Tan, Hong Kong (CN); Chi Kwan Lee, Hong Kong (CN); Shu Yuen Hui, Hong Kong (CN)

(73) Assignee: VERSITECH LIMITED, Hong Kong (CN)

( * ) Notice: Subject to any disclaimer, the term of this patent is extended or adjusted under 35 U.S.C. 154(b) by 0 days.

(21) Appl. No.: 15/566,564

(22) PCT Filed: Apr. 23, 2015

(86) PCT No.: PCT/CN2015/077290
§ 371 (c)(1),
(2) Date: Oct. 13, 2017

(87) PCT Pub. No.: WO2016/169022
PCT Pub. Date: Oct. 27, 2016

(65) Prior Publication Data
US 2018/0092179 A1 Mar. 29, 2018

(51) Int. Cl.
*H05B 37/02* (2006.01)
*H05B 33/08* (2006.01)
(Continued)

(52) U.S. Cl.
CPC .......... *H05B 33/0827* (2013.01); *H02M 1/14* (2013.01); *H02M 3/156* (2013.01);
(Continued)

(58) Field of Classification Search
CPC ............ H05B 33/0815; H05B 33/0827; H05B 33/0845; H05B 33/0851
(Continued)

(56) References Cited

U.S. PATENT DOCUMENTS 8,193,725 B2   6/2012   Chen et al.
2010/0283322 A1  11/2010   Wibben
(Continued)

FOREIGN PATENT DOCUMENTS

CN    102103831 A    6/2011
CN    102270430 A    12/2011
(Continued)

OTHER PUBLICATIONS

International Preliminary Report on Patentability in corresponding PCT Application No. PCT/CN2015/077290, dated Jan. 28, 2016.
(Continued)

*Primary Examiner* — Tung X Le
(74) *Attorney, Agent, or Firm* — Leason Ellis LLP

(57) ABSTRACT

A single-stage AC-DC single-inductor multiple-output (SIMO) LED driver uses a single inductor (L) to drive multiple independent LED strings ($34_1$-$34_n$) with Power Factor Correction (PFC). The driver uses a diode bridge (20) to achieve initial AC to DC conversion. The output of the bridge (20) is provided to a buck converter whose output is shared with multiple LED strings by a time division multiplex circuit. Feedback is used to separately control the current supplied to each LED string by using a separate reference for each string and controlling the width of the current pulse provided to a string. Current balancing in every LED string can be achieved with the same voltage reference without the need for additional circuitry.

10 Claims, 10 Drawing Sheets

(51) Int. Cl.
*H02M 3/158* (2006.01)
*H02M 1/14* (2006.01)
*H02M 3/156* (2006.01)
*H02M 7/06* (2006.01)
*H02M 1/00* (2006.01)
*H02M 1/42* (2007.01)

(52) U.S. Cl.
CPC ............. *H02M 3/158* (2013.01); *H02M 7/06* (2013.01); *H05B 33/0815* (2013.01); *H05B 33/0818* (2013.01); *H05B 33/0866* (2013.01); *H02M 1/42* (2013.01); *H02M 2001/009* (2013.01); *Y02B 20/348* (2013.01)

(58) Field of Classification Search
USPC ........................................ 315/186, 192, 193
See application file for complete search history.

(56) References Cited

U.S. PATENT DOCUMENTS

| | | | | |
|---|---|---|---|---|
| 2010/0328946 | A1* | 12/2010 | Borkar | H05B 33/0845 362/249.02 |
| 2011/0080102 | A1* | 4/2011 | Ge | H05B 33/0815 315/200 R |
| 2011/0199793 | A1* | 8/2011 | Kuang | H05B 33/0815 363/21.13 |
| 2013/0285565 | A1* | 10/2013 | Feng | H05B 33/0839 315/186 |
| 2014/0210360 | A1* | 7/2014 | Mednik | H05B 33/0815 315/186 |
| 2014/0218978 | A1* | 8/2014 | Heuken | H02M 3/33523 363/21.16 |
| 2015/0289331 | A1* | 10/2015 | Chen | H05B 33/0815 315/186 |
| 2017/0245339 | A1* | 8/2017 | Modepalli | H05B 33/0857 |

FOREIGN PATENT DOCUMENTS

| | | |
|---|---|---|
| DE | 10 2011 117455 A1 | 5/2013 |
| WO | WO 2014/123255 A1 | 8/2014 |

OTHER PUBLICATIONS

Extended European Search Report of European Application No. EP 15889511 dated Nov. 16, 2018.

\* cited by examiner

AC-DC SINGLE-INDUCTOR MULTIPLE-OUTPUT LED DRIVERS

CROSS-REFERENCE TO RELATED PATENT APPLICATIONS

This application is a U.S. National Phase Application under 35 U.S.C. § 371 of International Patent Application No. PCT/CN2015/077290, filed Apr. 23, 2015, which is incorporated by reference in their entirety. The International Application was published on Oct. 27, 2016 as International Publication No. WO 2016/169022 A1 under PCT Article 21 (2).

FIELD OF THE INVENTION

The present invention relates generally to a single-stage AC-DC single-inductor multiple-output (SIMO) power converter, which transforms a universal AC mains source into multiple DC output voltages, each of which can be individually connected to an LED string. More particularly, the present invention relates to a SIMO with Power Factor Correction (PFC) and independent control of output currents.

BACKGROUND OF THE INVENTION

The market for light emitting diodes (LEDs) has a high potential in the global general lighting market. Light management systems and color control of LED light, which can affect the mood of the end users, enabling a purpose-friendly ambience, will shape the market into a new sphere.

There is currently a strong demand for color (RGB) and tunable white LED lamps with reduced costs and smaller form factor. Many companies are interested in producing and selling innovative and cost-effective solutions for driving multiple LED strings in large panel displays or general lighting applications. However, the existing topologies for driving multiple LED strings are very inefficient. They typically require multiple DC-DC converters and complex circuitry which increase the total component count and overall bill of material costs. The cost and complexity increases with the total number of LED strings.

Existing topologies for driving multiple LED strings are very inefficient. They typically require multiple DC-DC converters and complex circuitry, which increase the total component count and overall material costs. Further, the cost and complexity increases with the total number of LED strings.

Conventional AC-DC LED drivers consist of an AC-DC converter followed by multiple constant-current DC-DC converters, one for each LED string. FIG. 1 shows the simplified system architecture of this traditional AC-DC LED driver.

As depicted in FIG. 1, there is an AC-DC converter 10 driven by the AC mains 11. The AC-DC converter in turn drives DC-DC converters 12, one for each LED string 14. The number of DC-DC converters scales, i.e., increases, with the number of LED strings. This will inevitably lead to higher costs and a larger form factor as the total number of LED strings increases.

Recent research has proposed a DC-DC LED driver which can reduce the number of DC-DC converters (i.e. the number of inductors) by combining them using a single-inductor multiple-output (SIMO) DC-DC converter 16 and providing power using a time-multiplexing control. In general, they can be represented by the system architecture shown in FIG. 2. Compared with the conventional driver topology, the SIMO topology offers a simple, scalable and low-cost solution since it uses only a single inductor L to drive multiple independent LED strings.

The LED driver shown in FIG. 2 is powered by a DC voltage source 15. All the LED strings are driven by the common SIMO DC-DC switching converter 16. The energy from the inductor in the power stage of the switching regulator is distributed across the LED strings in a time-multiplexed manner. The benefit of this SIMO topology is that only one single inductor L is needed to drive multiple outputs. A pulse width modulation controller is used to determine the ON and OFF timing of the power and output switches primarily using current-sense voltage as the feedback signal. This kind of battery-powered DC-DC SIMO is mostly useful for low-power portable lighting applications.

An AC-DC converter 10 can be added in front of the aforementioned DC-DC SIMO 16 to form a two-stage AC-DC SIMO driver. This particular type of AC-DC converter generates an unregulated DC voltage across a capacitor 17 at its output, which output becomes the input voltage for the subsequent DC-DC converter 16. FIG. 3 shows the system architecture of this existing two-stage AC-DC SIMO LED driver. Notice that this AC-DC SIMO driver does not incorporate power factor correction (PFC).

An AC-DC multi-channel SIMO LED driver with PFC was reported in the literature in 2014. Basically, this is a two-stage driver topology where the first stage is a boost converter 20 with power-factor correction (PFC) 22 and the second stage is a buck converter 16', which distributes identical DC current across multiple LED channels using a single inductor L. FIG. 4 shows the system architecture for this kind of two-stage SIMO LED driver.

It is evident that the control logic for this two-stage system is quite complicated as it involves a front-end and back-end controller. A major drawback for this particular AC-DC SIMO LED driver is that it does not support unequal currents across LED strings, i.e. so-called unbalanced loads. In addition, the fact that it operates in a continuous conduction mode (CCM) and employs only a single energizing phase per switching cycle means that it suffers from serious cross-regulation among the LED strings. A load transient in one LED channel will inevitably affect the DC operating point in other unchanged LED channels.

SUMMARY OF THE INVENTION

The present invention relates to an AC-DC topology for driving multiple LED strings directly from a universal AC mains supply with power factor control (PFC) and independent current control for each LED string.

In this design AC mains input voltage is rectified by a diode bridge to generate a DC signal. A small filter capacitor is connected to the output of the diode bridge in order to mitigate the output voltage ripple in the DC signal. The rectified voltage and current then enter the power stage of a buck converter. Only a single inductor is used in the power stage of a DC-DC switching converter. The DC-DC converter operates in a Discontinuous Conduction Mode (DCM) in which the inductor current is reset to zero at the end of every switching cycle. Based on the SIMO topology, the inductor current is assigned sequentially to each individual LED string in a round-robin fashion. Each of the LED strings is independently driven and is decoupled from the other strings with minimal cross-interference. Current balancing can be realized by using the same current reference signal across all the LED strings without the need for additional circuitry. In addition, the current in each individual LED string can be controlled separately by assigning a unique current reference in each LED string.

The SIMO topology of the present invention offers a simple, scalable and low-cost solution for driving multiple LED strings at selected currents so that lighting applications such as color-mixing and dimming control, are provided. Unlike the conventional LED driver topology using multiple DC-DC converters, the driver of the present invention with PFC employs only a single DC-DC converter for all the LED strings. In addition, the driver directly accepts a universal AC mains line voltage, which is particularly useful for general lighting applications. It facilitates easy replacement of traditional fluorescent tubes. It also leads to a high power factor for improved stability and transmission efficiency of the transmission line network.

The driver of the present invention offers a much simplified control scheme. It mainly consists of a feed-forward loop for input power control as well as a feedback loop (one for each LED string) for regulating the average current in each string. When there are $\underline{N}$ independent LED strings, the average current in each LED string is controlled by the "slow response" outer feedback loop. In the outer feedback loop, the Controller, which may be a proportional integral (PI) controller, collects the current-sense voltage. This current-sense voltage is proportional to the LED current and is compared against a fixed reference. The difference between the reference value and the collected value is passed as a feedback signal to the PI controller and a pulse width modulator (PWM) for generating a PWM duty ratio for the power switches.

In order to reduce the number of hardware components, although there are N outer feedback loops, one for each of the LED strings, the Controller time-multiplexes the outputs of the PI compensators together before going into the PWM modulator.

The input feed forward loop is used to keep the dynamic response of the system in balance despite any variation in the line voltage. If AC line voltage is changed, the PWM duty ratio will be adjusted accordingly to reach the target steady-state value. Subsequently, the power factor can be corrected by working in Discontinuous Conduction Mode (DCM). The power factor of the proposed controller can reach more than 99%.

Compared with a prior art two-stage PFC AC-DC SIMO driver, the single-stage PFC AC-DC SIMO driver of the present invention offers a much simplified control scheme. A major drawback of the prior art two-stage PFC AC-DC SIMO driver is that it operates in continuous conduction mode (CCM), which causes it to suffer from serious cross-regulation among LED strings. In the present driver, cross-regulation can be minimized since it is operating in discontinuous mode (DCM) with multiple-energizing phases per switching cycle. Also, unlike its two-stage counterpart, the driver of the present invention supports either balanced or unbalanced LED loads. Thus, both balanced and unbalanced LED loads are supported in the proposed single-stage AC-DC SIMO LED driver of this invention.

BRIEF DESCRIPTION OF THE DRAWINGS

The present invention can be more fully understood by the following detailed description of the preferred embodiments, with reference made to the accompanying drawings, wherein.

DETAILED DESCRIPTION OF EXEMPLARY EMBODIMENTS OF THE INVENTION

Figure 1:
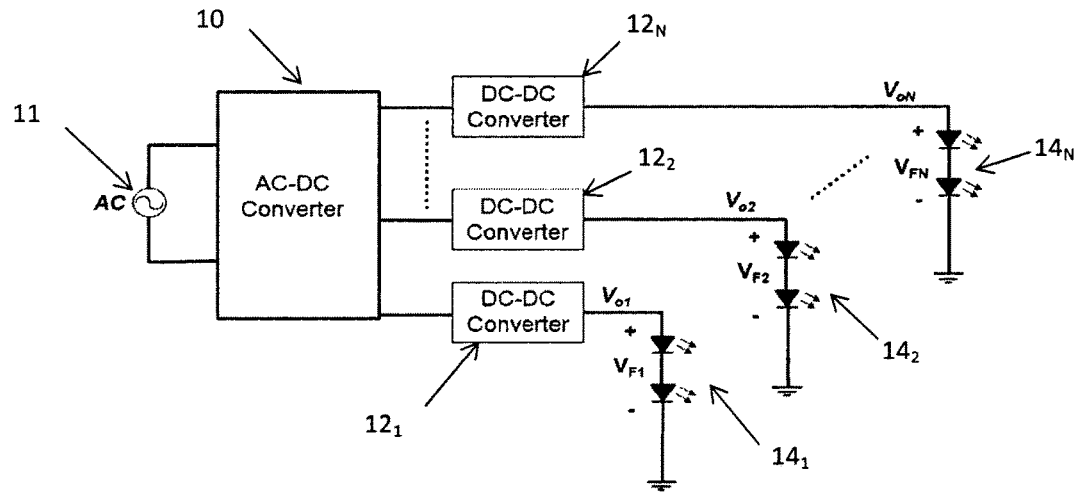
FIG. 1 is a block diagram of a prior art AC-DC LED driver.
Figure 2:
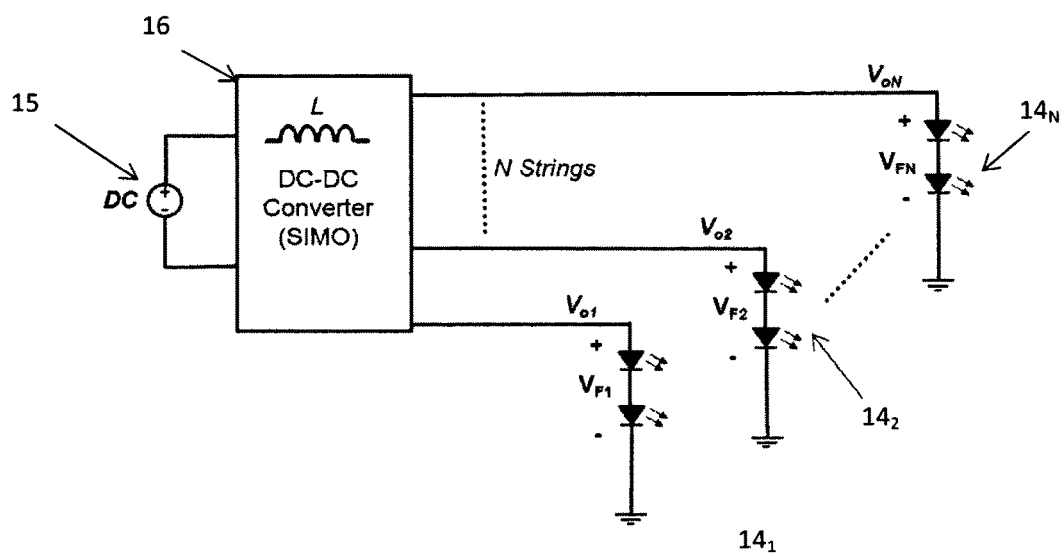
FIG. 2 is a block diagram of a prior art DC-DC SIMO LED driver.
Figure 3:
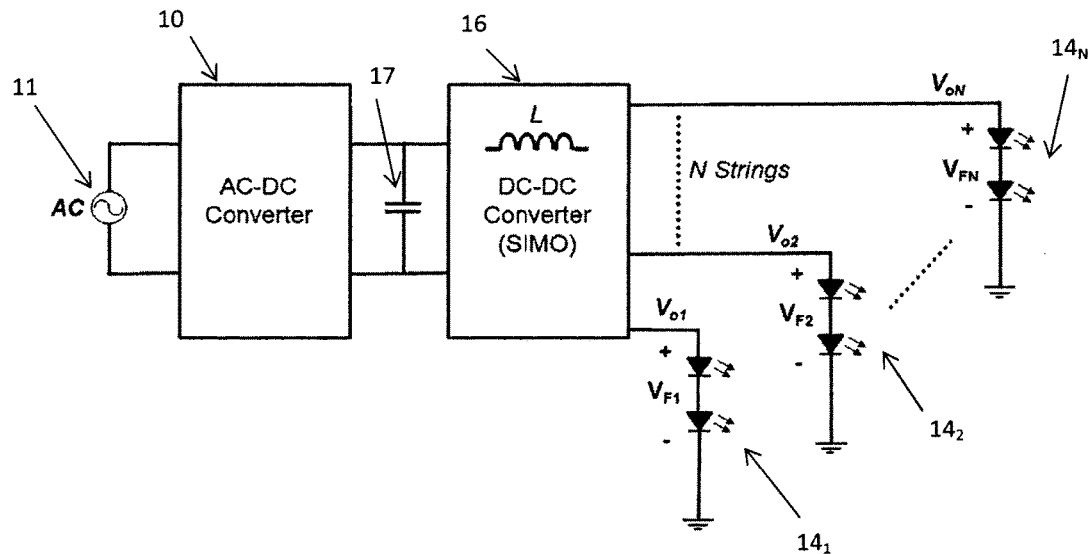
FIG. 3 is a block diagram of a prior art two stage AC-DC SIMO LED driver.
Figure 4:
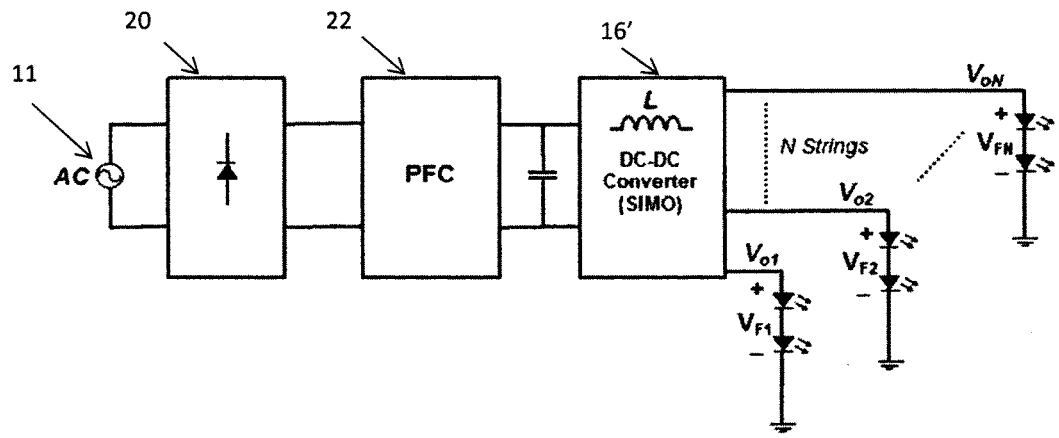
FIG. 4 is a block diagram of a prior art multi-channel LED backlight driver with boost PFC and SIMO buck converter.
Figure 5:
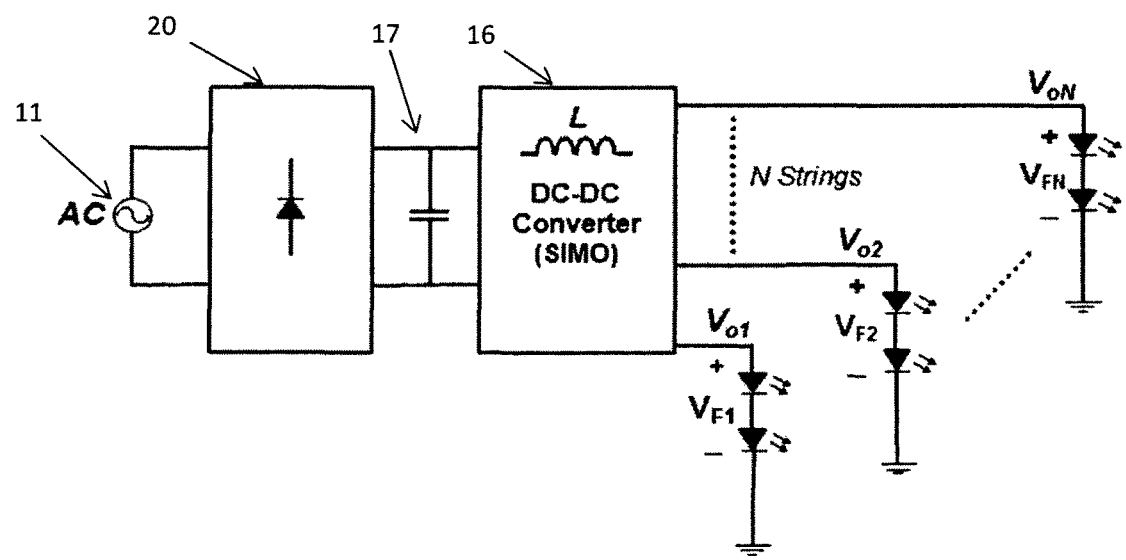
FIG. 5 is a simplified functional block diagram of AC-DC SIMO LED driver according to the present invention.

FIG. 5 shows a simplified functional block diagram of the LED driver according to the present invention. As shown, the AC mains input voltage 11 is rectified by a diode bridge 20 to create a DC voltage. For the sake of clarity, "mains" electricity is the general-purpose alternating-current (AC) electric power supply. In the US, this electric power supply is referred to by several names including household power, household electricity, house current, power line, domestic power, wall power, line power, AC power, city power, street power, and grid power.

Figure 13:
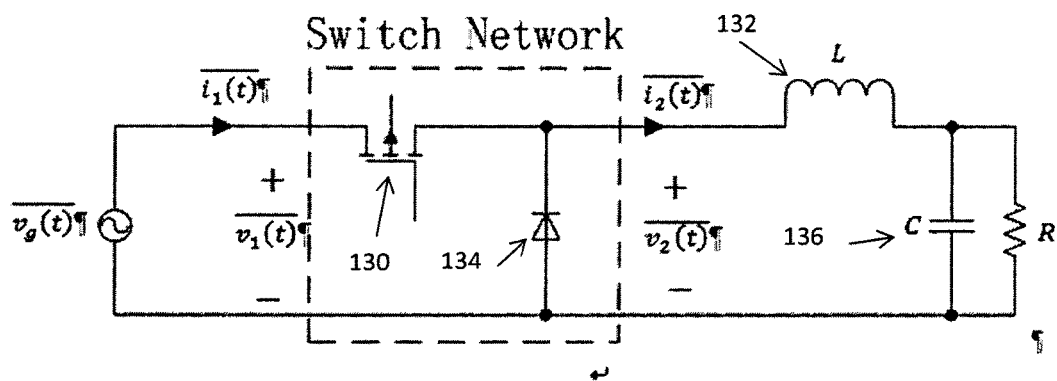
FIG. 13 is a schematic of a buck converter.

A small filter capacitor 17 is connected to the output of the diode bridge in order to smooth the output voltage ripple. The rectified voltage and current then enter the power stage of the DC-DC Converter 16. This may be, for example, a buck converter. A buck converter is a DC to DC converter as shown in FIG. 13 with a switching transistor 130 between its input and a so-called "flywheel circuit" that includes an inductor 132 between the transistor and the converter output, a back biased diode 134 between the flywheel circuit input and ground, and a capacitor 136 between both the flywheel circuit and the Converter output, and ground. The load is resistor R. Only a single inductor 132 is used in the power stage of the DC-DC switching converter.

The DC-DC converter operates in Discontinuous Conduction Mode (DCM) in which the inductor current is reset to zero at the end of every switching cycle, and the inductor current is assigned sequentially through power switches (transistors) to each individual LED string $14_1$, $14_2$-$14_N$ in a round-robin fashion. Thus, each LED string is independently driven and is decoupled from the other strings with minimal cross-interference.

Figure 6:
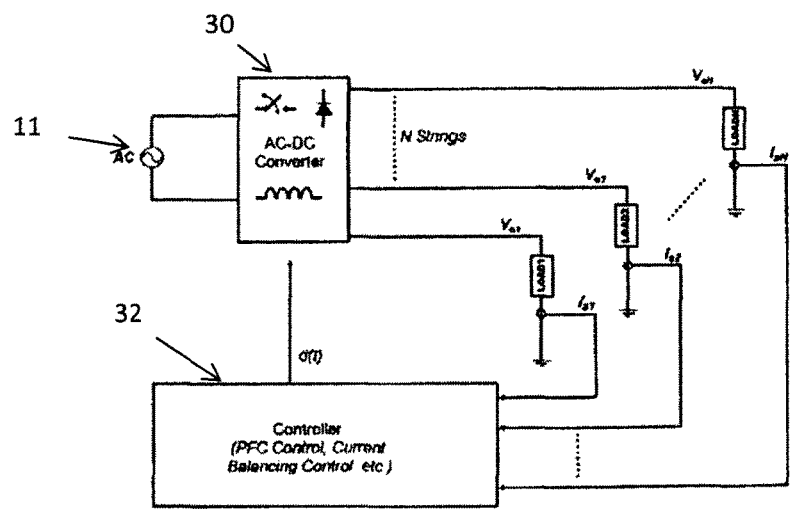
FIG. 6 is a simplified functional block diagram of AC-DC SIMO LED driver according to the present invention showing the feedback to a Controller.

FIG. 6 shows the diagram of FIG. 5 with the bridge 20 and the DC-DC converter 16 merged into an AC-DC Converter 30. Also, as shown in FIG. 6, the current in each LED string 14 is measured and fed back to a Controller 32. The Controller 32 thus collects the current-sense voltage (which is proportional to the LED current) as a feedback signal. It compares each feedback signal with an appropriate fixed reference. The difference between the reference value and the collected value for each LED string is used in the Controller to control a pulse width modulator in the Controller in order to generate a PWM duty ratio for the power switches that distribute current to the LED strings.

Figure 7:
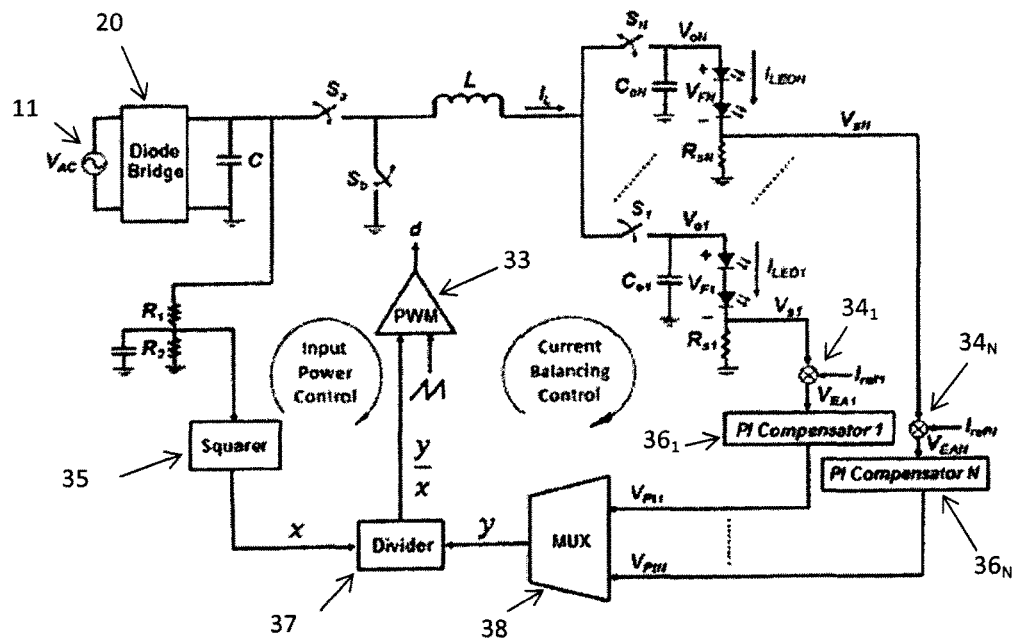
FIG. 7 is a circuit schematic of AC-DC SIMO LED driver according to the present invention.

The LED driver of the present invention is regulated by two control loops. As an illustrative example, FIG. 7 shows the circuit implementation of an AC-DC SIMO buck LED driver with N independent LED strings. The average current in each LED string is controlled by the "slow response" outer or current balancing control loop. This outer loop uses the current-sense voltages $V_{s1}$-$V_{sN}$ (which are proportional to the LED current) as feedback signals. They are compared against fixed references $I_{ref1}$-$I_{refN}$ in comparators $34_1$-$34_N$. The resulting error signals are passed through individual PI Compensators $36_1$-$36_N$ to create signals $V_{PIN}$-$V_{PIN}$, i.e., the differences between the fixed references and the current-sense voltages are passed to the PWM 33 and are used to generate a PWM duty ratio for the power switches $S_1$-$S_N$. In practice, there will be a total of N outer feedback loops, one for each LED string.

In order to minimize the hardware resources, the outputs of the PI compensators 36 are time-multiplexed together in multiplexer (MUX) 38 before going into the PWM 33. In this way, the subsequent logic elements beyond the PI compensators 36 are time shared among all the SIMO outputs.

The faster inner or input power control loop uses the rectified input voltage $V_{in}$ at the output of the diode bridge 20 as a feed forward signal. It is divided in resistors $R_1$, $R_2$ and then is squared in circuit 35 to become the scaled input power x. The MUX 38 output is then modulated (i.e. divided in divider 37) by the scaled input power before reaching the PWM 33. The idea is that when the AC line voltage increases (i.e. the magnitude of $V_{in}$ increases), the PWM duty ratio should be reduced in order to bring the output voltage (and hence the corresponding LED current) back into its target steady-state value. Likewise, when the AC line voltage decreases (i.e. the magnitude of $V_{in}$ decreases), the PWM duty ratio should be increased in order to maintain the same steady-state voltage and current values at the outputs. Ideally, the DC operating point of the SIMO outputs should not be affected by any changes in the input voltage. The input feed forward loop essentially serves to improve the dynamic response of the system due to any variations in the line voltage.

Figure 8:
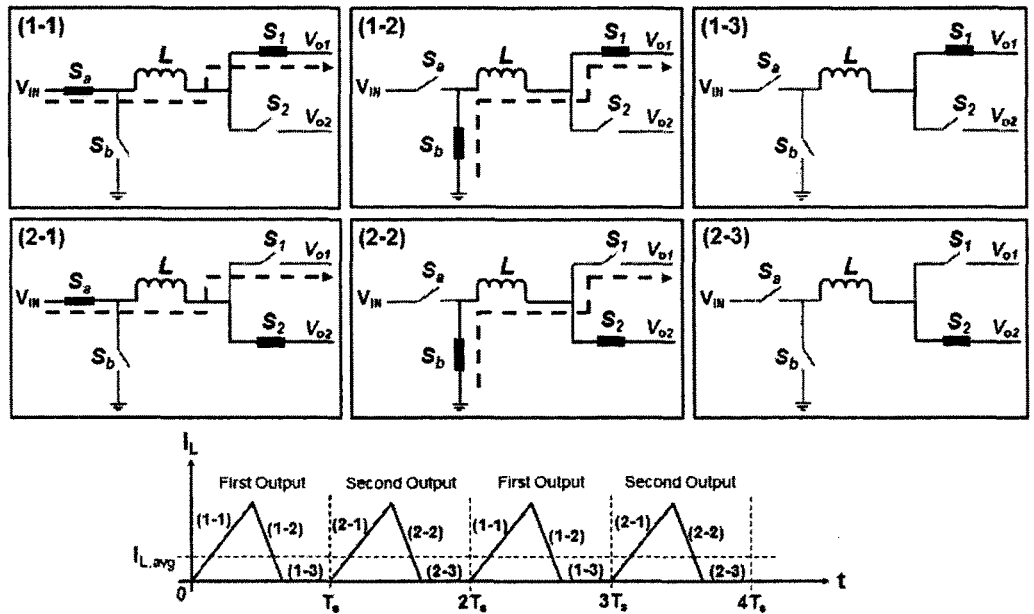
FIG. 8 illustrates the control sequence of the SIDO DC-DC converter of the present invention under normal operation.

A single-inductor dual-output (SIDO) DC-DC buck converter is used as an example to illustrate the control sequence of the SIMO LED driver of the present invention. There are a total of four switches in this SIDO converter, namely two power switches ($S_a$, $S_b$) and two output switches ($S_1$, $S_2$). FIG. 8 depicts the control sequence of the SIDO DC-DC converter under normal operation. The same control sequence can also be scaled for additional LED strings by adding additional switches.

As shown in FIG. 8, during the first sub-interval (1-1), Sa is ON (closed) and Sb is OFF (open). The inductor current increases at a rate of $(V_{in}-V_{o1})/L$. Output switch $S_1$ is ON and $S_2$ is OFF since only the first output is enabled. During the second sub-interval (1-2), $S_a$ is OFF and $S_b$ is ON. The inductor current decreases at a rate of $V_{o1}/L$. During the third sub-interval (1-3), both $S_a$ and $S_b$ are OFF. The inductor current remains at zero during this idle period. The same process is repeated in the next switching period for the second output in which Output switch $S_1$ is OFF and $S_2$ is ON. The energy is transferred from the inductor to the two outputs in an interleaving manner as shown by the graph at the bottom of FIG. 8. Assuming a balanced load condition and an average inductor current value of $I_{L,avg}$, the average output current in either output, i.e. $I_{o1}$ or $I_{o2}$, is given by:

$$I_{o1} = I_{o2} = \frac{I_{L,avg}}{2} \qquad (1)$$

Figure 9:
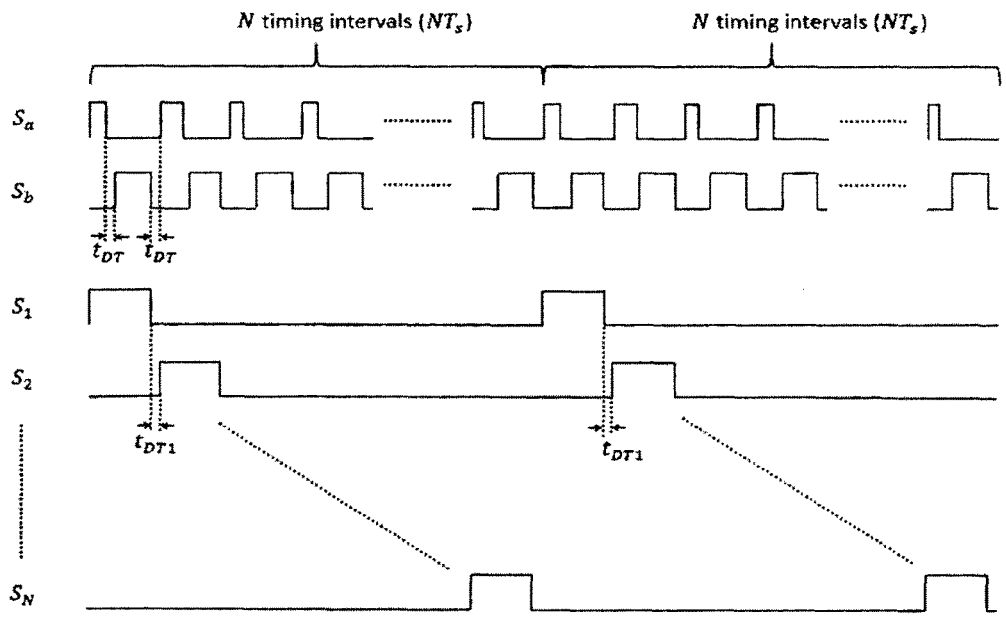
FIG. 9 is a timing diagram for the power and output switches of the driver of the present invention.

It is also important to note the switching sequence of all of the SIMO switches, namely the high-side/low-side power switches and the output switches of the LED driver. The ideal waveforms of the power switches ($S_a$, $S_b$) and the output switches ($S_1$, $S_2$, . . . , $S_N$) are shown in FIG. 9.

At the beginning of each switching cycle, the high-side switch, $S_a$, is ON during which the inductor current ramps up with a slope of $m_1=(V_g-V_o)/L$. Once the inductor current reaches the peak current limit, the high-side switch, $S_a$, is turned OFF and after a small dead time period has elapsed, the low-side switch, $S_b$, is turned ON, during which time the inductor current ramps down with a slope of $m_2=-V_o/L$. This switching sequence then repeats itself for every switching cycle.

On the other hand, the output switch corresponding to each LED string, namely $S_1$, $S_2$, . . . , $S_N$, is ON only during any one of the N switching cycles, where N is the total number of LED strings in a SIMO topology. The output switch is OFF during the remaining (N−1) switching cycles. In other words, each LED string takes a turn to obtain the energy from the time-shared inductor in a round-robin fashion. Dead-times are included between the high-side and low-side power switches to avoid shoot-through current. Dead-times are also included between the neighboring output switches to prevent inadvertent cross-conduction between any two consecutive LED strings.

Figure 10:
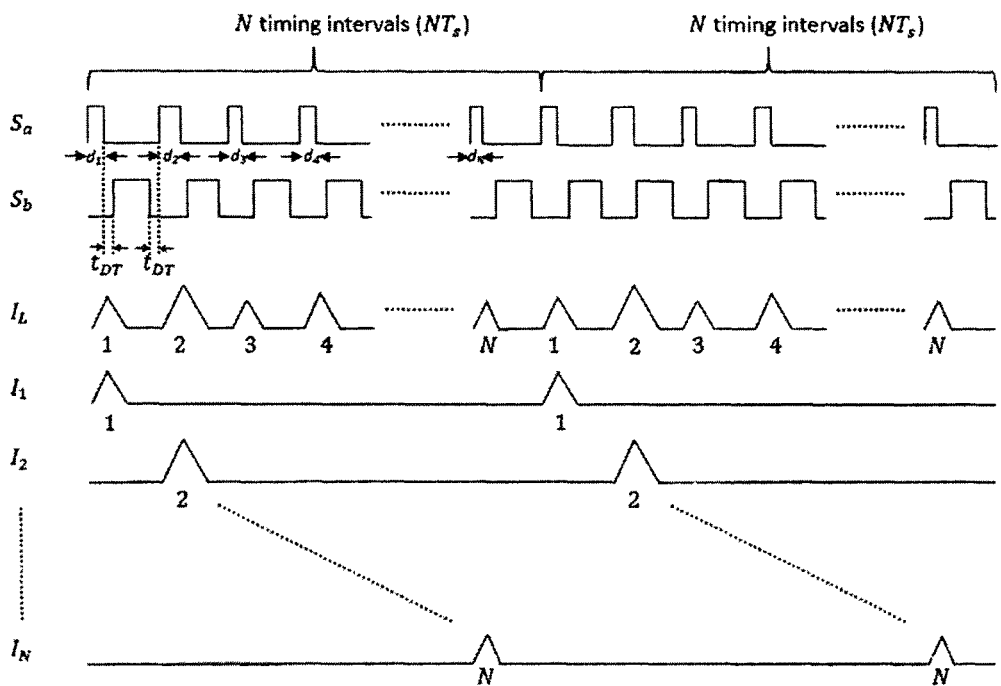
FIG. 10 is a timing diagram for the power switches, inductor current and the branch current of the driver of the present invention.

FIG. 10 shows the timing diagram of the high-side and low-side power switches ($S_a$, $S_b$), the inductor current ($I_L$) as well as the branch current $I_1$, $I_2$, . . . $I_N$, i.e. the current going across the respective output switches. It should be noted that for the general case of unbalanced loads, different average inductor current can be assigned to each LED string. Notice that in FIG. 10, the inductor peak current is distinct for each LED string.

Figure 11A:
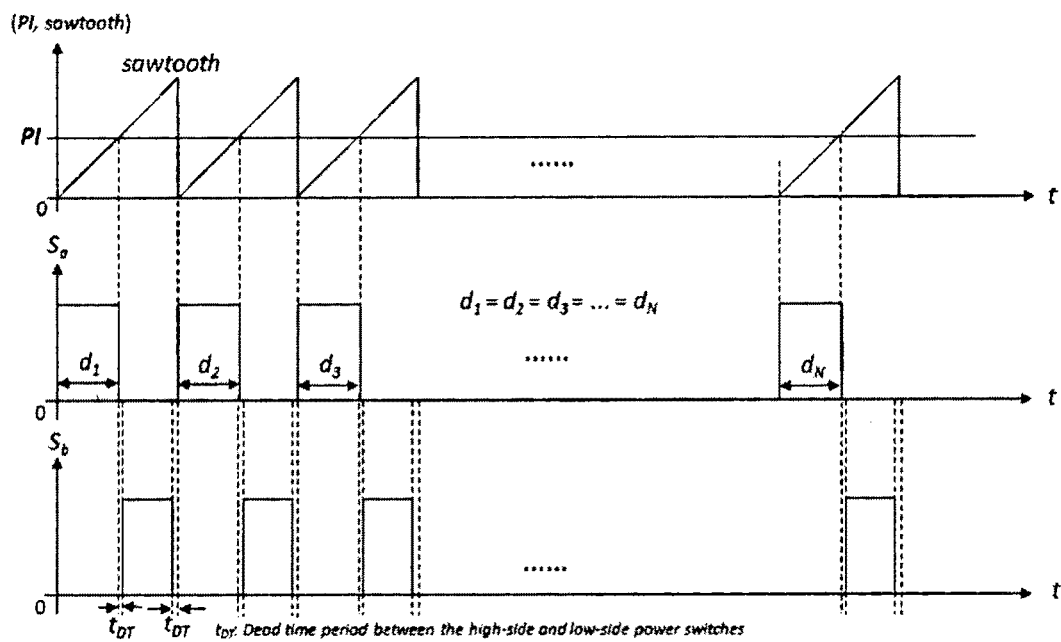
FIG. 11*a* shows timing diagrams for identical PWM duty ratios and FIG. 11*b* shows timing diagrams for different PWM duty ratios across all the LED strings.
Figure 11B:
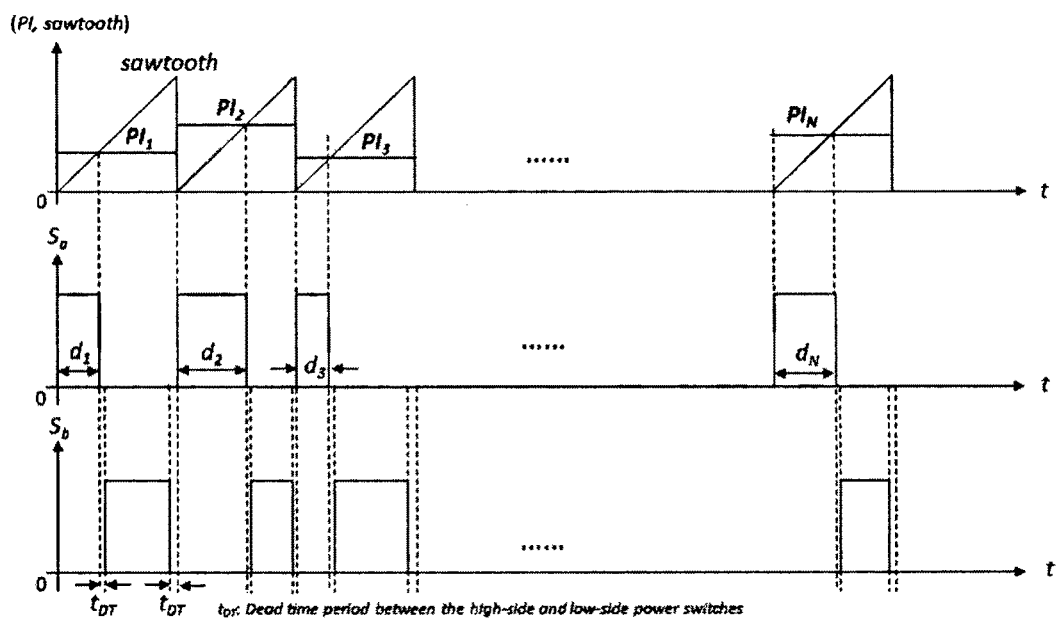

The on-time duty ratios for the high-side power switch, namely $d_1, d_2, \ldots, d_N$, corresponding to each LED string are determined by PWM trailing-edge modulation. FIG. 11(a) shows the case of balanced LED loads when the duty ratios are identical among the LED strings and FIG. 11(b) shows the case of unbalanced LED loads when the duty ratios are different among the LED strings.

It is assumed that the proposed AC-DC SIMO circuit operates in DCM where the inductor current always returns to zero at the end of every switching cycle. In the SIMO topology, the inductor current is being assigned to each individual LED string in a time-multiplexed fashion. The use of time-multiplexing control with multiple energizing phases means that the outputs are fully decoupled in time, resulting in negligible cross-regulation.

Suppose the switching frequency of the buck converter is represented as $f_s=1/T_s$. The frequency of the output current in each string is given by:

$$f_i = f_2/N = 1/NT_2 \qquad (2)$$

where $i=1,2,3,\ldots,N$ and N is the total number of LED strings.

Figure 12:
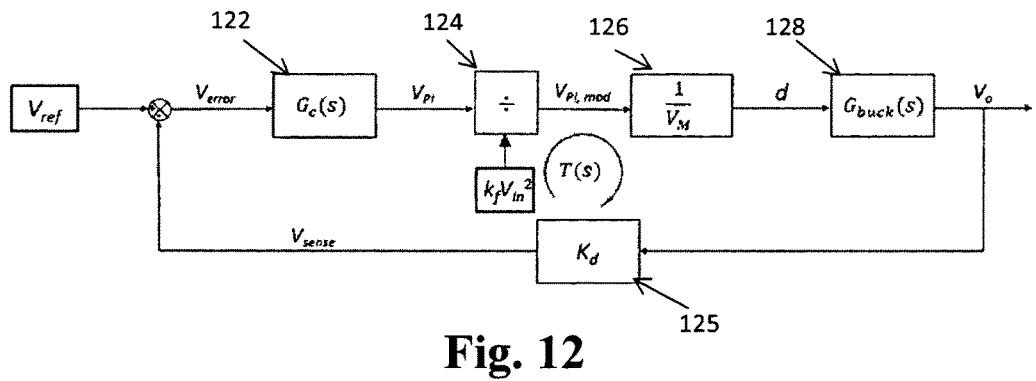
FIG. 12 is a small-signal block diagram of the closed-loop SIMO system according to the present invention.

FIG. 12 shows the small-signal block diagram for the proposed closed-loop SIMO system when any one of the LED strings is connected to the power stage. In this figure, $G_c(s)$ represents the transfer function of the controller. It is essentially a standard PI compensator which can be expressed as follows:

$$G_c(s) = K_p + \frac{K_i}{s} = \frac{sK_p + K_i}{s} \qquad (3)$$

where $K_p$ is the proportional gain and $K_i$ is the integral gain.

The output of the PI compensator $V_{PI}$ is divided in divider 124 by the scaled input power $k_f V_{in}^2$ to become $V_{PI,mod}$ which is fed into the PWM modulator with a gain 126 of $1/V_m$, ($V_m$ is the amplitude of the saw tooth waveform) in order to generate a duty ratio d. $G_{buck}(s)$ 128 is the transfer function of the power stage of the buck converter which is given by:

$$G_{buck}(s) = \frac{V_{in}(1 + sC_o R_{ESR})}{1 + s\left(\frac{L}{R_{LOAD}} + C_o R_{ESR}\right) + s^2 L C_o \left(1 + \frac{R_{ESR}}{R_{LOAD}}\right)} \qquad (4)$$

where $V_{in}$ is the nominal input voltage, $C_o$ is the output capacitance, $R_{ESR}$ is the equivalent-series resistance (ESR) of the output capacitor, L is the inductance of the power inductor, and $R_{LOAD}$ is the load resistance. The load resistance is the sum of the DC resistance of the LED string and the small current-sense resistance which can be represented as:

$$R_{LOAD} = n \times R_{LED} + R_{cs} \approx n \times R_{LED} \qquad (5)$$

The DC resistance of the LED string can be obtained from the I-V curve of the chosen LED, depending on the target DC operating point ($I_F$, $V_F$). Assuming that $R_{CS} \ll n \times R_{LED}$ (where n is the total number of LEDs in each string), the load resistance can simply be approximated as $n \times R_{LED}$ which is shown in equation (3). Hence equation (2) can be re-expressed as:

$$G_{buck}(s) = \frac{V_{in}(1 + sC_o R_{ESR})}{1 + s\left(\frac{L}{nR_{LED}} + C_o R_{ESR}\right) + s^2 L C_o \left(1 + \frac{R_{ESR}}{nR_{LED}}\right)} \qquad (6)$$

Finally, $K_d$ represents the resistor divider ratio 125 between $R_{cs}$ and $n \times R_{LED}$ which can be written as:

$$K_d = \frac{R_{cs}}{R_{cs} + n \times R_{LED}} \approx \frac{R_{cs}}{n \times R_{LED}} \qquad (7)$$

Hence, the open-loop gain T(s) of the system can be represented as:

$$T(s) = G_c(s) \times \frac{1}{k_f V_{in}^2} \times \frac{1}{V_m} \times G_{buck}(s) \times K_d \qquad (8)$$

By substituting (1)-(5) into (6), we have $$T(s) = \qquad (9)$$

$$\frac{R_{cs}}{nR_{LED} k_f V_{in} V_m} \frac{(K_i + sK_p)(1 + sC_o R_{ESR})}{s\left\{\left(1 + s\left(\frac{L}{nR_{LED}} + C_o R_{ESR}\right) + s^2 L C_o \left(1 + \frac{R_{ESR}}{nR_{LED}}\right)\right)\right\}}$$

In general, if the magnitude of the open-loop gain |T(s)| is sufficiently large, then the current in each LED string should track closely with its corresponding current reference. The average current in each LED string is determined by the corresponding current reference value. If the same current reference is applied to all the LED strings, identical average current in each string can be achieved. LED dimming can also be realized in any particular string by adjusting its corresponding reference in order to modulate the average current.

Figure 14:
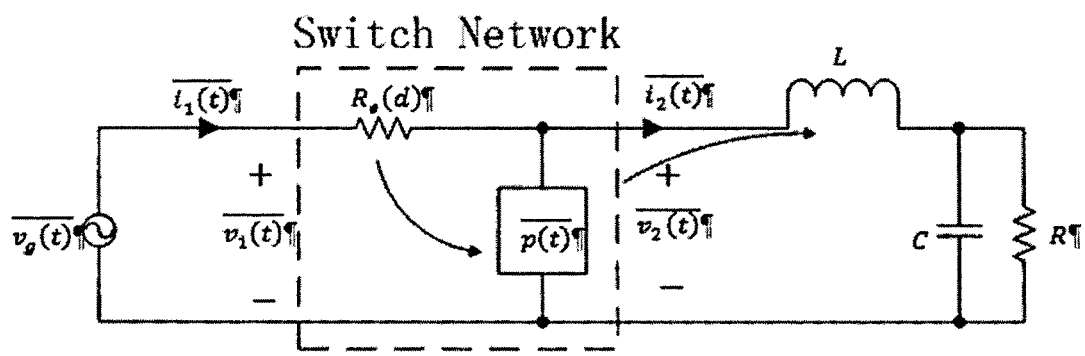
FIG. 14 is an equivalent circuit of the buck converter of FIG. 13.

Another important design consideration for the AC-DC converter is the Power Factor Correction (PFC). PFC can be achieved easily by operating the proposed driver in DCM. Consider the buck converter shown in FIG. 13. The equivalent circuit of the buck converter can be obtained by using the average switch modeling approach as depicted in FIG. 14.

By operating the buck converter in DCM, the low-frequency components of the switch network input obey Ohm's law. The effective resistance Re(d) seen by the input port is given by:

$$R_e(d) = \frac{2L}{d^2 T_s} \qquad (10)$$

where d denotes the on-time duty ratio. It becomes evident that an effective resistor $R_e(d)$ is connected across port 1 and 2. At a low frequency, the inductor is approximated as a short circuit and the capacitor is approximated as an open circuit. Hence, the buck converter circuit can be effectively reduced to the circuit shown in FIG. 15.

Figure 15:
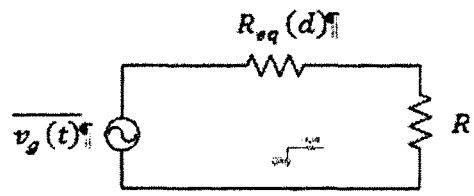
FIG. 15 is a DC equivalent circuit of the buck converter when the load is a resistor.

From FIG. 15, it can be seen that the load is purely resistive. Therefore, PFC can be achieved by operating the buck converter in DCM.

The functionality of the present invention was verified with time-domain simulations conducted using PSIM software based on the design specifications given in Table 1.

TABLE 1

| Design Parameter | Value |
| --- | --- |
| AC mains supply | 220/110 V 50/60 Hz |
| DC-linkfilter capacitor | 0.1 μF |
| Power Inductor | 20 μH |
| Output capacitor (in every LED string) | 1 mF |
| Target forward current (in every LED string) | 350 mA |

Figure 16:
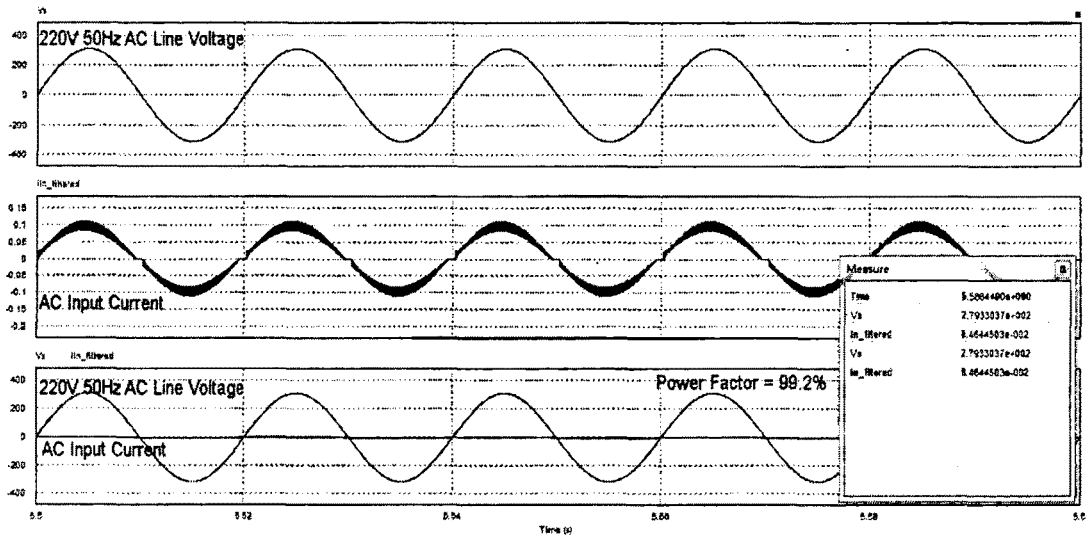
FIG. 16 is an illustration of the AC line voltage and input current of a simulation of the circuit according to the present invention at 220V and 50 Hz.
Figure 17:
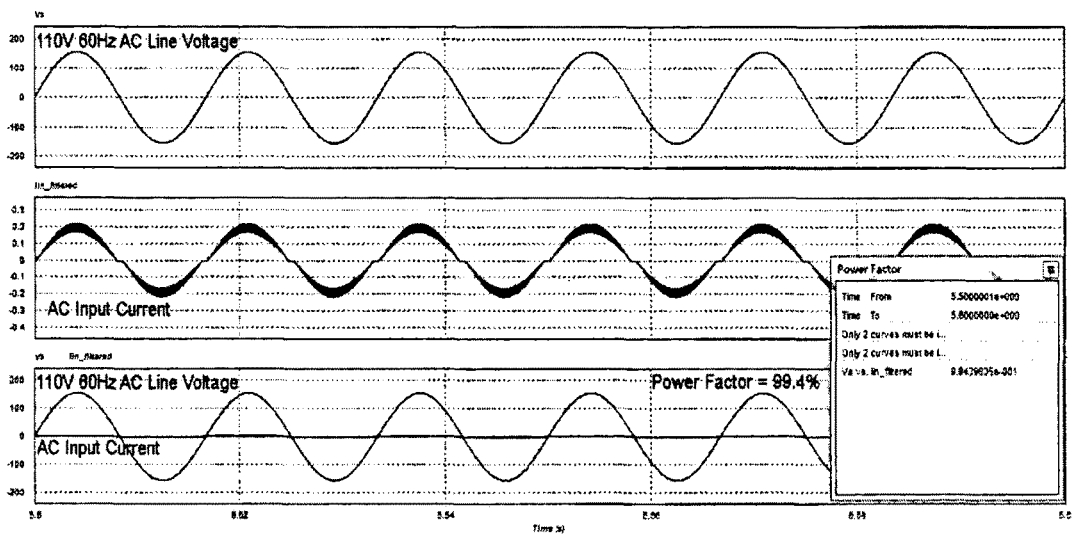
FIG. 17 is an illustration of the AC line voltage and input current of a simulation of the circuit according to the present invention at 110V and 60 Hz

In the simulation a total of three parallel LED strings were connected to the proposed AC-DC SIMO driver. Each of the individual LED string consists of five identical LEDs connected in series. The first set of simulations was performed based on the 220 V, 50 Hz AC power supply while the second set of simulations were performed based on the 110 V, 60 Hz AC power supply. In both scenarios, the same average current across all three LED strings, so-called balanced load condition, was assumed. FIG. 16 shows the simulated input wave forms corresponding to a 220V, 50 Hz AC source with a resulting power factor correction of 99.2%. FIG. 17 shows the simulated waveforms corresponding to a 110V, 60 Hz AC source with a power factor correction of 99.4%.

Figure 18:
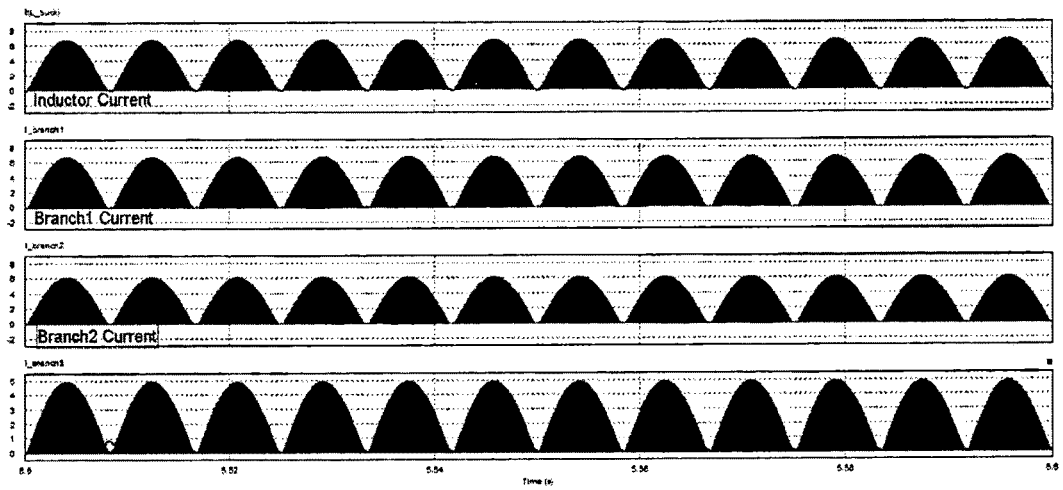
FIG. 18 is an illustration of the DCM inductor current and branch currents in a simulation of the circuit according to the present invention.
Figure 19:
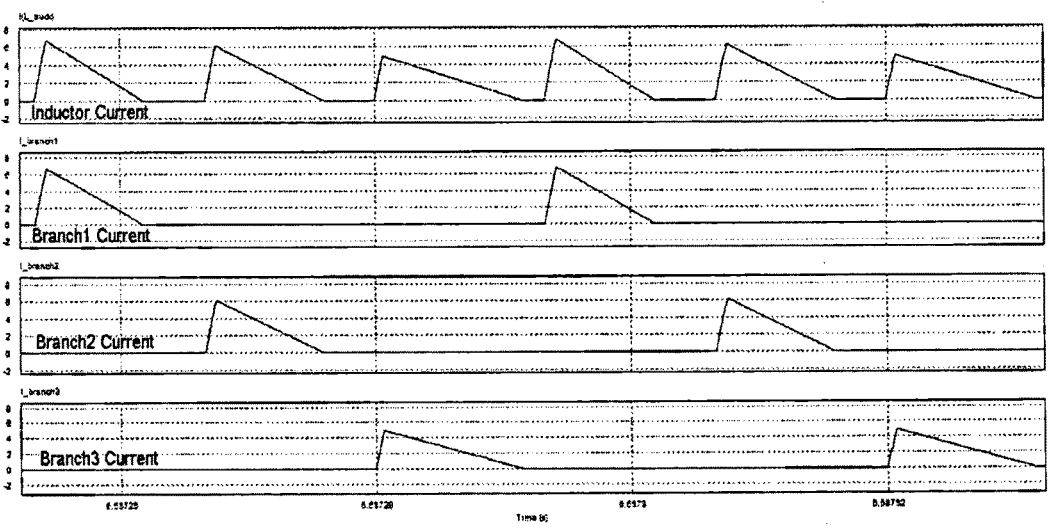
FIG. 19 is an enlarged view of the DCM inductor current and branch currents in a simulation of the circuit according to the present invention.

FIG. 18 shows the full view of the simulated inductor current and the branch current in each of the three independently-driven LED strings using an AC power supply of 220V, 50 Hz. FIG. 19 shows the corresponding close-up view of the simulated inductor current and the branch currents.

Figure 20:
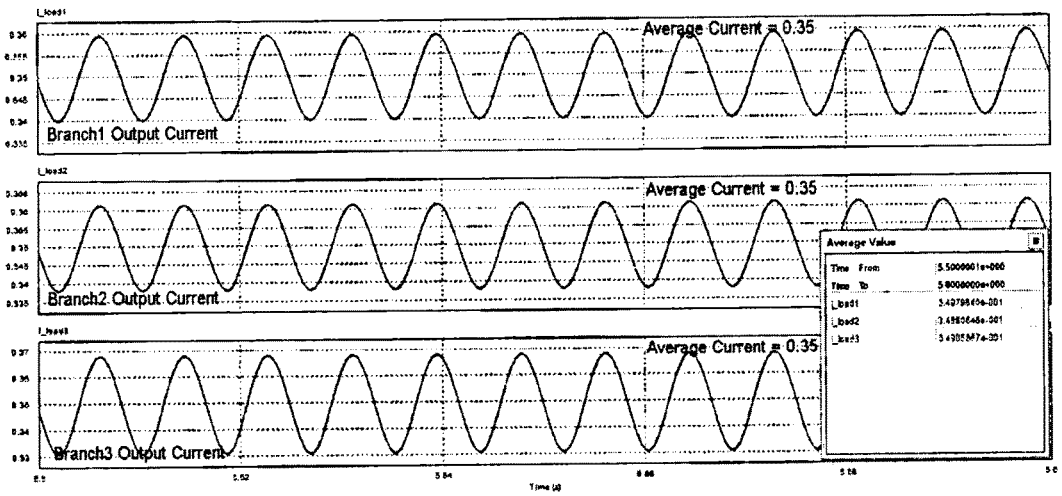
FIG. 20 is an illustration of the branch output currents under balanced load conditions of a circuit according to the present invention.

FIG. 20 shows the LED current in each of the three strings using an AC power supply of 220V, 50 Hz. Under balanced load condition, the simulated average current is 350 mA in each of the three LED strings, which meets the design specification.

Figure 21:
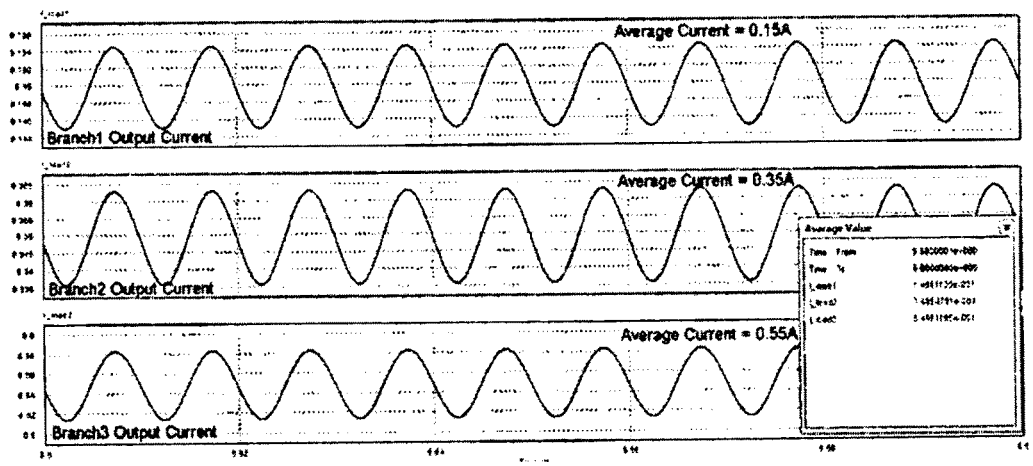
FIG. 21 is an illustration of the branch output currents under unbalanced load conditions of a circuit according to the present invention

In general, the average current in each of the three independently-driven LED strings can be different for the purpose of color-mixing and dimming. This unbalanced load condition is also simulated using the AC-DC SIMO LED driver of the present invention. FIG. 21 shows the simulated waveforms for the output currents in each LED string in steady-state condition. It shows that the average current values in the first, second and third LED strings are 150 mA, 350 mA and 550 mA, respectively.

From the simulations it can be seen that the overall functionality of the SIMO topology is verified. The inductor current is assigned to each of the three LED strings correctly in a time-multiplexed manner. Further, the power factor can reach more than 99%. Hence, the Power Factor Correction (PFC) is verified. The average current in each of the three LED strings is identical (ILED, avg=350 mA) with a peak-to-peak ripple within 10%. Thus, it can be seen that current balancing of the three LED strings can be achieved with high accuracy.

The proposed AC-DC SIMO LED driver also supports the general case of unbalanced LED loads in which the average current in each of the independently-driven strings are different. This is especially useful for general lighting applications in which color-mixing and dimming are required.

While the invention has been particularly shown and described with reference to preferred embodiments thereof, it will be understood by those skilled in the art that various changes in form and details may be made therein without departing from the spirit and scope of the invention. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What we claimed is:

1. A single-stage AC-DC single-inductor multiple-output (SIMO) light emitting diode (LED) driver comprising:
    an AC-DC rectifier circuit;
    a DC-DC converter that receives the output of the rectifier circuit and passes the rectifier output through an input switching circuit and an inductor to an output of the driver, said converter circuit including a control circuit which produces a control signal that causes the input switching circuit to alternately open and close;
    an output switching circuit that sequentially connects the output of the inductor to respective individual strings of LEDs in round robin fashion;
    comparator circuits that compare the current in an LED string to a reference, and set the period of time during which the output switching circuit connects the inductor to the respective string of LEDs based on the comparison so as to maintain a current level in the LED string; and
    a multiplexer circuit that multiplexes the outputs of the comparator circuits into a single signal y,
    wherein the control circuit for the switching circuit includes a first divider for providing a portion of the output of the rectifier circuit, a squaring circuit for squaring the portion of the output of the rectifier circuit to produce a signal x, and a second divider circuit for dividing the y signal by the x signal to produce the control signal for the switching circuit so that the effect of a change in input AC to the rectifier circuit has a reduced effect on the DC operating point of the driver.

2. The single-stage AC-DC single-inductor multiple-output (SIMO) light emitting diode (LED) driver of claim 1, wherein the DC-DC converter is a buck converter that includes a diode between ground and the junction of the switching circuit and the inductor.

3. The single-stage AC-DC single-inductor multiple-output (SIMO) light emitting diode (LED) driver of claim 1, wherein the current supplied to each LED string is controlled by using a separate reference for each string and controlling the width of the current pulse provided to a string from the inductor.

4. The single-stage AC-DC single-inductor multiple-output (SIMO) light emitting diode (LED) driver of claim 3, wherein the reference in each string is the same and the current in every LED string is the same.

5. The single-stage AC-DC single-inductor multiple-output (SIMO) light emitting diode (LED) driver of claim 3, wherein the reference in each string is configured to be different so that the current in each string is different.

6. The single-stage AC-DC single-inductor multiple-output (SIMO) light emitting diode (LED) driver of claim 1, with Power Factor Correction (PFC).

7. The single-stage AC-DC single-inductor multiple-output (SIMO) light emitting diode (LED) driver of claim 1, wherein the rectifier circuit is a full wave bridge rectifier with a capacitor across its output to reduce ripple.

8. The single-stage AC-DC single-inductor multiple-output (SIMO) light emitting diode (LED) driver of claim 1, further including a pulse width modulator driven by a cyclic waveform and the y divided by x signal, the output of such pulse width modulator determining the duty cycle of the switching circuit.

9. The single-stage AC-DC single-inductor multiple-output (SIMO) light emitting diode (LED) driver of claim 1, further including proportional integrator compensators between each comparator and the multiplexer.

10. The single-stage AC-DC single-inductor multiple-output (SIMO) light emitting diode (LED) driver of claim 1, wherein the input switching circuit includes a first switch connecting and disconnecting the output of the rectifier circuit with the inductor and a second switch connecting and disconnection the output of the rectifier circuit with ground, said switches operating during a single cycle of supplying current to an LED string in a discontinuous mode such that in a first mode the first switch is closed and the second switch is open, in a second mode the first switch is open and the second switch is closed and in a third mode both the first and second switch are open to create an idle period when there is no inductor current, whereby cross-interference among LED strings is reduced.

\* \* \* \* \*